United States Patent
Berger

[11] Patent Number: 5,899,493
[45] Date of Patent: May 4, 1999

[54] VEHICLE GAS BAG WITH DISCHARGE OPENINGS FORMED ALONG A SEAM

[75] Inventor: Jürgen Berger, Mutlangen, Germany

[73] Assignee: TRW Occupant Restraint Systems GmbH, Alfdorf, Germany

[21] Appl. No.: 08/892,383

[22] Filed: Jul. 14, 1997

[30] Foreign Application Priority Data

Jul. 18, 1996 [DE] Germany .................. 296 12 500 U

[51] Int. Cl.⁶ .......................... B60R 21/16; B60R 21/28
[52] U.S. Cl. ........................... 280/739; 280/743.1
[58] Field of Search ..................... 280/739, 743.1, 280/728.1, 742

[56] References Cited

U.S. PATENT DOCUMENTS

| | | | |
|---|---|---|---|
| 3,990,726 | 11/1976 | Oka et al. | 280/739 |
| 4,805,930 | 2/1989 | Takada | 280/739 |
| 5,186,488 | 2/1993 | Takano | 280/728.1 |

FOREIGN PATENT DOCUMENTS 1473794  5/1977  United Kingdom .

*Primary Examiner*—Peter C. English
*Attorney, Agent, or Firm*—Tarolli, Sundheim, Covell, Tummino & Szabo

[57] ABSTRACT

A gas bag for a vehicle occupant restraining system, which is adapted to be unfolded from a folded state into a deployed state by gases led into the interior of the gas bag, comprises at least one fabric part having edges which are connected together along at least a part of their length by a seam. This seam is formed by a plurality of stitches and at least one thread. The length of the stitches and the tension of the thread is so set that, in the deployed state of the gas bag, a plurality of discharge openings are formed between respectively adjacent stitches between two edges sewn together. A controlled discharge of the gases takes place through the discharge openings.

4 Claims, 2 Drawing Sheets

VEHICLE GAS BAG WITH DISCHARGE OPENINGS FORMED ALONG A SEAM

The invention relates to a gas bag for a vehicle occupant restraining system.

BACKGROUND OF THE INVENTION

Gas bags for a vehicle occupant restraining system are known, which have discharge openings through which, with the gas bag in the deployed state, a part of the gas employed for deployment of the gas bag may be discharged.

By control of the discharge of gas from a deployed gas bag it is possible to obtain an optimum restraining action by the deployed gas bag in a manner adapted to the severity of the accident in an individual case and to the weight of the vehicle occupant. Discharging gas from the gas bag may be allowed for essentially in two different ways: on the one hand discharge openings may be provided in the wall of the gas bag, which are either opened at the outset or are opened by the pressure in the interior of gas bag, and on the other hand by having gas permeable regions in the fabric. A disadvantage in the case of discharge openings formed in the wall is the complexity of manufacture. Furthermore it is not possible to prevent certain fluctuations in the opening pressure in the case of discharge openings adapted to open when a certain pressure is reached.

BRIEF DESCRIPTION OF THE INVENTION

The invention is to provide a gas bag in which discharge openings are formed in an extremely simple manner when the gas bag is in the deployed state. In accordance with the invention a gas bag for a vehicle occupant restraining system is provided, which is adapted to be unfolded from a folded state into a deployed state by means of gases lead into the interior of the gas bag. The gas bag comprises at least one fabric part having edges which are connected together along at least a part of their length by a seam. This seam is formed by a plurality of stitches and at least one thread. The length of the stitches and the tension of the thread is so set that, in the deployed state of the gas bag, a plurality of discharge openings are formed between respectively adjacent stitches between two edges sewn together. By means of the discharge openings, a controlled discharge of the gases takes place through the discharge openings. Therefore, in a gas bag in accordance with the invention it is neither necessary to provide for a separately formed discharge opening in the wall of the gas bag nor is it necessary to employ a special-purpose gas-permeable fabric in order to ensure a controlled discharge from the deployed gas bag. In fact instead of this, the discharge openings are formed between the two sewn together fabric plies adjacent to the seam, such seam in any case being required for the connection of the fabric plies. By making a judicious selection of the parameters of the seam and more particularly the stitch length and the tension of the thread the discharge behavior of the gas through the discharge openings being formed can be set in the desired fashion.

In accordance with a preferred embodiment of the invention there is a provision such that the stitch length in the seam is smaller than approximately half an inch. With such a stitch length it is possible to obtain a good compromise between sufficient strength of the seam and a large overall cross section of the discharge openings.

BRIEF DESCRIPTION OF THE DRAWINGS

The invention will now be described in the following with reference to the accompanying drawings.

DETAILED DESCRIPTION OF THE INVENTION

Figure 1:
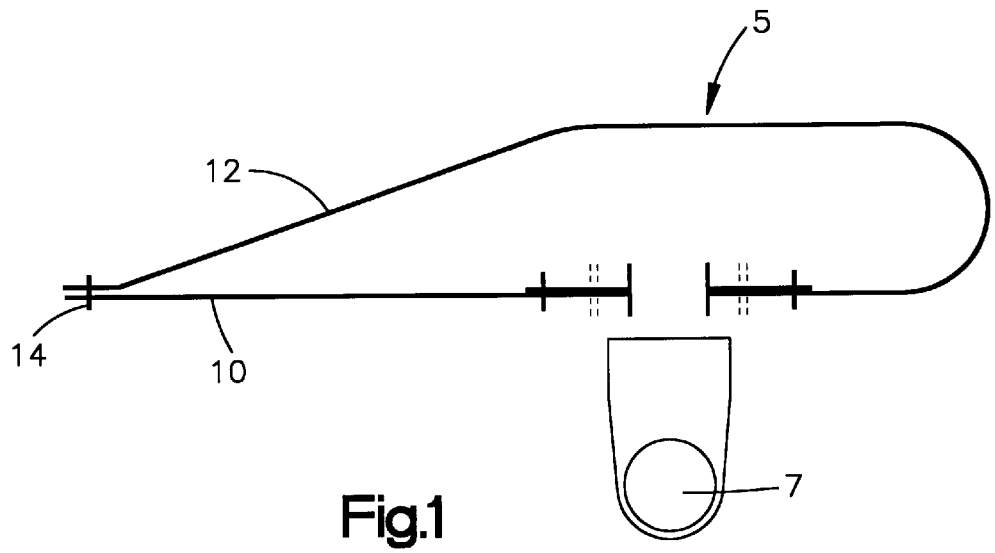
FIG. 1 shows a diagrammatic cross section taken through a gas bag of the invention.
Figure 2:
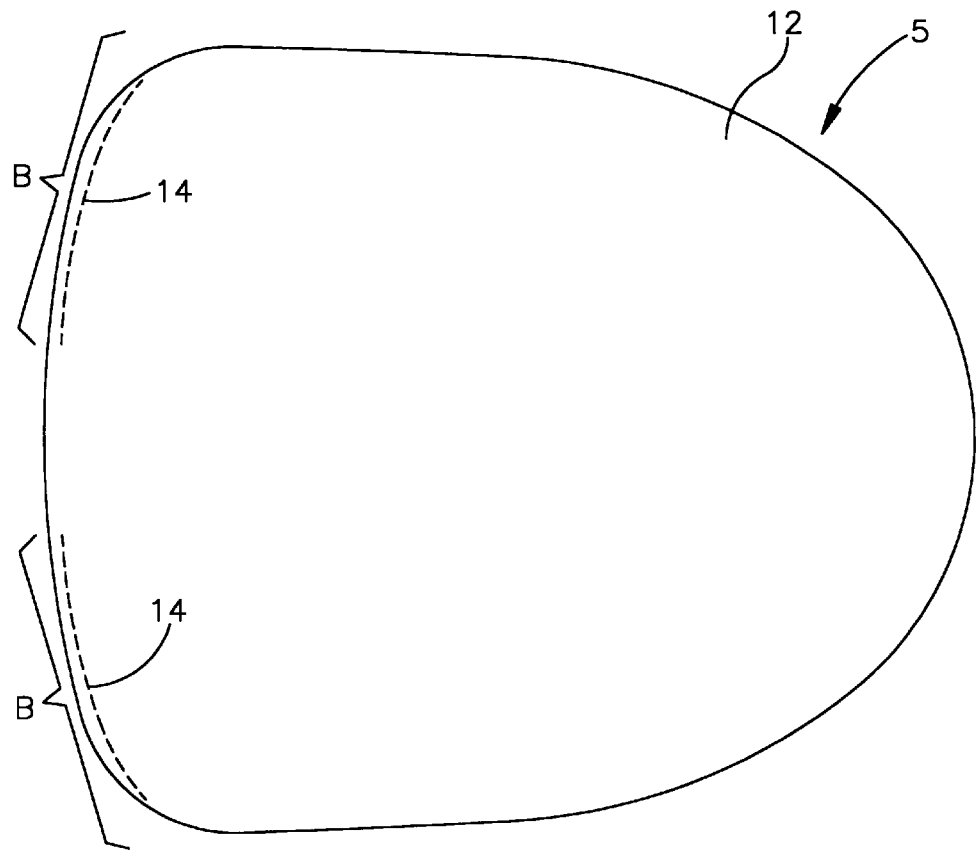
FIG. 2 is a diagrammatic plan view of the gas bag of FIG. 1.

In FIGS. 1 and 2 a gas bag in accordance with the invention is illustrated, which can be unfolded from a folded state, which is not illustrated, into a deployed state by means of gases which can be provided by a gas generator 7 and which are lead into the interior of the gas bag. On the left hand side in terms of FIG. 1 two fabric plies 10 and 12 (FIG. 1) of the gas bag 5 are connected together by means of a seam 14. When the gas bag 5 is installed in a vehicle, the seam 14 faces away from the vehicle occupant to be protected and for example faces the windscreen or the dashboard of the vehicle.

Figure 3:
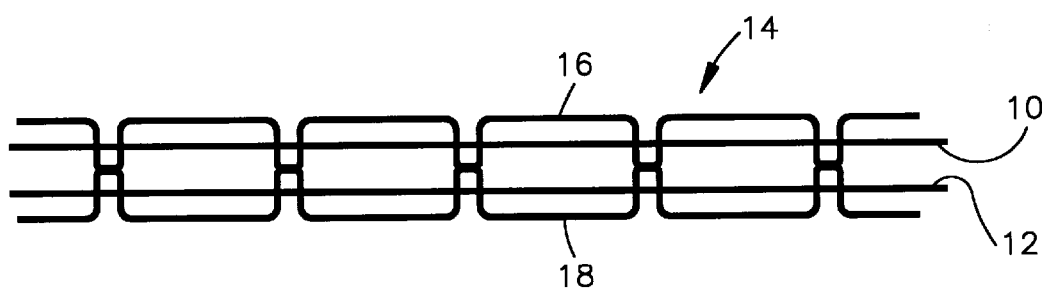
FIG. 3 shows diagrammatically on a larger scale a cross section taken through a seam as employed in the gas bag of FIG. 1 in a non-pressurized condition.
Figure 4:
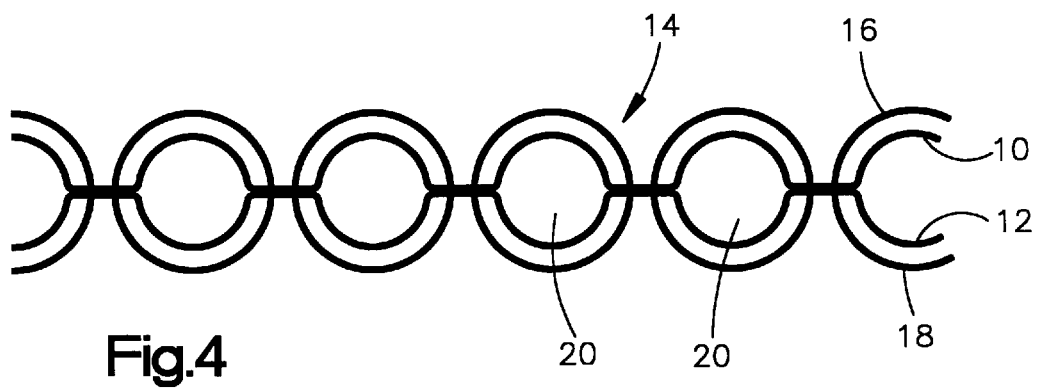
FIG. 4 diagrammatically and on a larger scale shows a cross section taken through the gas bag of FIG. 1 in a pressurized state.

The seam 14 is made up of a top thread 16 and a bottom thread 18 (FIGS. 3 and 4). The stitch length in the seam 14 and also the tension of the top and bottom threads 16 and 18 are so set that in the deployed condition of the gas bag, owing to the pressure obtained in the interior thereof, discharge openings 20 are produced between adjacent stitches in the seam 14, and through these openings a part of the gas contained within the interior of the gas bag may escape (FIG. 4). Preferably a stitch length of up to one centimeter (less than half an inch) is used. With such a stitch length the seam will on the one hand possess a strength sufficient for all applications and on the other hand will have an adequate overall gas discharge cross section.

In FIG. 2 the reader will see the regions B in which the seam 14 is preferably employed. These regions correspond to the margin parts of the gas bag 5 which in the deployed condition of the gas bag bear a comparatively small load. It is also possible to utilize the seam 14 in the section present between the regions B. In this case it may be an advantage to reduce the stitch length in this section in order to increase the strength of the seam 14.

Figure 5:
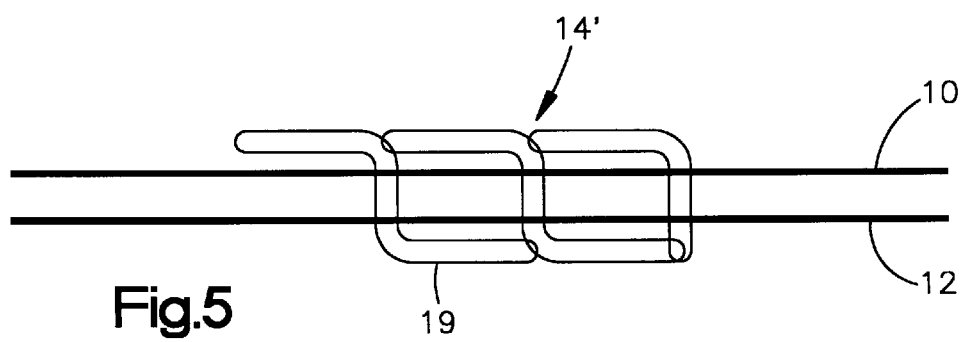
FIG. 5 diagrammatically and on a larger scale illustrates a cross section through an alternative seam used in the gas bag of FIG. 1 in a non-pressurized condition.

In FIG. 5 a seam 14' is illustrated, which unlike the design depicted in FIGS. 3 and 4 is formed by a single thread 19. In the case of the seam shown in FIG. 5 as well the overall cross section produced when the seam is under pressure may be affected by the tension of the thread and by the stitch length.

The total cross section of the discharge openings 20 may be more particularly set by the selection of the stitch length. By having a shorter stitch length there is then a smaller overall discharge cross section. Furthermore the overall discharge cross section can be affected by the tension of the thread as for example the top or bottom thread. A seam 14 made with a high thread tension leads to a smaller overall discharge cross section. All in all there is, as compared with conventional gas bags, the possibility of cheaper manufacture, seeing that neither a special-purpose fabric nor separate manufacturing steps are necessary for the formation of the discharge openings.

I claim:

1. A gas bag for a vehicle occupant restraining system, which is adapted to be unfolded from a folded state into a deployed state by gases directed into the interior of said gas bag, and which comprises two fabric plies having edges which are connected together along at least a part of their length by a seam formed by a plurality of stitches and at least one thread, the length of said stitches and the tension of said thread being so set that, in said deployed state of said gas bag, a plurality of discharge openings are formed between said two fabric plies and defined by respective adjacent stitches, whereby a controlled discharge of said gases takes place through said discharge openings between the fabric plies.

2. The gas bag of claim 1, wherein said stitch length in said seam is less than approximately half an inch.

3. The gas bag of claim 1, wherein said seam comprises a top thread and a bottom thread.

4. The gas bag of claim 1, wherein said seam has a single thread.

* * * * *